(12) United States Patent
Suzuki et al.

(10) Patent No.: US 9,022,137 B2
(45) Date of Patent: May 5, 2015

(54) FASTENING TOOL

(75) Inventors: Yasuyuki Suzuki, Kanagawa (JP);
Toshinaka Shinbutsu, Yamanashi (JP);
Shuichi Amano, Yamanashi (JP)

(73) Assignee: Nissei Co., Ltd., Yamanashi (JP)

( * ) Notice: Subject to any disclaimer, the term of this patent is extended or adjusted under 35 U.S.C. 154(b) by 407 days.

(21) Appl. No.: 13/640,216

(22) PCT Filed: Apr. 6, 2011

(86) PCT No.: PCT/JP2011/058742
§ 371 (c)(1),
(2), (4) Date: Oct. 9, 2012

(87) PCT Pub. No.: WO2011/126060
PCT Pub. Date: Oct. 13, 2011

(65) Prior Publication Data
US 2013/0025898 A1    Jan. 31, 2013

(30) Foreign Application Priority Data

Apr. 9, 2010   (JP) ................. 2010-090127

(51) Int. Cl.
| B25B 21/00 | (2006.01) |
| B25B 13/48 | (2006.01) |
| B25B 23/14 | (2006.01) |
| B25B 23/142 | (2006.01) |
| F16B 39/16 | (2006.01) |

(52) U.S. Cl.
CPC .............. B25B 21/002 (2013.01); B25B 13/48 (2013.01); B25B 23/141 (2013.01); B25B 23/1427 (2013.01); F16B 39/16 (2013.01)

(58) Field of Classification Search
CPC .. B25B 21/002; B25B 21/007; B25B 23/141; B25B 23/142; B25B 23/1427; B25B 13/48
USPC ........... 173/214, 176; 81/473, 474, 475, 478; 279/103
See application file for complete search history.

(56) References Cited

U.S. PATENT DOCUMENTS

| 7,793,572 B2* | 9/2010 | Hirt et al. ................. 81/473 |
| 2008/0136125 A1* | 6/2008 | Hirt et al. .................. 279/103 |
| 2011/0232431 A1* | 9/2011 | Deneault ................. 81/474 |

FOREIGN PATENT DOCUMENTS

| JP | 50-032147 B1 | 10/1975 |
| JP | 55-150976 A | 11/1980 |
| JP | 60-141477 A | 7/1985 |
| JP | 2000-240632 A | 9/2000 |
| JP | 2003-156024 A | 5/2003 |
| JP | 2006-088279 A | 4/2006 |
| JP | 2006-167894 A | 6/2006 |

OTHER PUBLICATIONS

International Search Report of PCT/JP2011/058742, mailing date May 17, 2011.

* cited by examiner

*Primary Examiner* — Andrew M Tecco
(74) *Attorney, Agent, or Firm* — Westerman, Hattori, Daniels & Adrian, LLP

(57) ABSTRACT

A fastening tool is provided that incorporates, in an outer annular body into which a first nut is inserted to be driven to rotate, an inner annular body into which a first nut and a second nut having a pitch different from the pitch of the first nut are inserted to be driven to rotate, and that simultaneously rotates the two nuts and fastens the nuts to a bolt. A flange shaft body is driven to rotate relatively to the outer annular body and the inner annular body via a plurality of balls. The balls are held by the flange shaft body and pressed towards notches of the outer annular body and the inner annular body with urging forces of first and second urging members via holding members respectively.

13 Claims, 5 Drawing Sheets even in a double nut mechanism. The present invention has been devised in view of the problems in the past and to solve the problems and attains objects explained below.

An object of the present invention is to provide a fastening tool for double nuts for tightening two nuts with a simultaneous operation at different torque for each of the individual nuts in a double nut fastening mechanism.

Another object of the present invention is to provide a fastening tool for double nuts for tightening each of the individual nuts at a different torque in a double nut fastening mechanism for nuts having different pitches.

In order to attain the objects, the present invention has means mentioned below.

The fastening tool according to a first invention comprises:

an outer annular body (1) that is driven to rotate and has, in the front thereof, an opening section (1a) for engaging a first fastening body (2);

an inner annular body (3) that is housed relatively rotatably in the outer annular body (1) to be driven to rotate and has, in the front thereof, an insertion hole (3a) coaxial with the opening section (1a) for engaging a second fastening body (4);

a flange shaft body (5) having a flange (5b) in the front portion and an operation section (5d) for rotational driving in the rear portion, in which the front end face of the flange (5b) is provided relatively rotatably in contact with a step surface (1c) formed in an inner hole (1b) as a space inside the outer annular body (1) and the rear end face of the inner annular body (3);

a plurality of first and second through holes (5a) and (5e) formed in the flange (5b), the center axial lines of the first through holes being disposed further in an outer position than the center axial line of the second through holes;

outer annular body engaging sections (1d) as recessed portions arranged and formed on the step surface (1c) so as to correspond to the first through holes (5a);

inner annular body engaging sections (3c) as recessed portions arranged and formed on the rear end face of the inner annular body (3) so as to correspond to the second through holes (5e);

a plurality of first balls (6) capable of fitting in the outer annular body engaging sections (1d) and inserted into the first through holes (5a);

a plurality of second balls (7) capable of fitting in the inner annular body engaging sections (3c) and inserted into the second through holes (5e);

a first holding member (8) in contact with the rear end face of the flange (5b) and holding the first balls (6);

a second holding member (10) in contact with the rear end face of the flange (5b) and holding the second balls (7);

a first urging member (9) arranged between the first holding member (8) and the outer annular body (1) for pressing the first holding member (8) toward the flange shaft body (5); and a second urging member (11) arranged between the second holding member (10) and the outer annular body (1) and pressing the second holding member (10) toward the flange shaft body (5).

The fastening tool according to a second invention is characterized in that, in the first invention, a holding member (31) for holding the first fastening body (2) in the opening section (1a, 30a) is arranged in the opening section (1a, 30a).

The fastening tool according to a third invention is characterized in that, in the first invention, a holding member (41) for holding the second fastening body (4) in an insertion hole (40a) is arranged in the insertion hole (3a, 40a).

FASTENING TOOL

FIELD OF THE INVENTION

The present invention relates to a fastening tool for fastening a fastening member such as a nut and, more particularly, to a fastening tool that can simultaneously fasten two fastening members such as nuts.

BACKGROUND ART

A large number of techniques for fastening a nut to a bolt and fastening the nut not to loosen have been proposed. The techniques are carried out and well known. Among the techniques, a fastening mechanism for fastening two nuts to the same bolt one on top of the other and preventing the nuts from loosening by use of a frictional force of the nuts is based on a method generally and frequently practiced. The tightening of the nuts is generally performed by manual operation using a wrench. However, in fastening operation in mass production, nuts are fastened using a power-rotated fastening tool. This kind of fastening work is usually performed for each nut one at a time.

As an example of the fastening tool, an impact wrench that applies an intermittent striking force to a fastening member is known. It is well known that a fastening action of the impact wrench is performed using a driving force of an electric motor, an air motor or the like (e.g., Japanese Patent Application Laid-Open No. 2006-88279: Patent Document 1). The fastening action is widely applied in automobile-related fields. A method of placing two nuts one on top of the other and fastening one of the nuts as an unremovable lock nut is also known (e.g., Japanese Patent Application Laid-Open No. 2000-240632: Patent Document 2). Further, as another fastening form, a method of fastening a member on a nut side to a structure making use of relative movements of a bolt and a screw of the nut is also known (e.g., Japanese Patent Application Laid-Open No. 2003-156024: Patent Document 3). Furthermore, a double nut tightening tool for forming two threads having different pitches in a bolt, simultaneously screwing two nuts having different pitches into the threads, and tightening the nuts is also proposed (Japanese Patent Application Laid-Open No. 2006-167894: Patent Document 4).

As explained above, a conventional fastening tool was mainly a tool for separately turning and fastening a nut or a bolt. Tools of various forms have been proposed according to modes of fastening. However, these tools were applied basically to a mode of fastening a single part. Thus, for example, even in a locking structure by double nuts, a structure for separately fastening the individual nuts is adopted for two nuts.

As one of such a locking and fastening structure, a structure employing a fastening method for preventing loosening with double nuts is proposed and carried out in which two nuts of a coarse thread and a fine thread formed in different pitches were screwed onto a bolt which has two types of threads having different pitches formed in one bolt, for example, a bolt provided with a coarse thread and a fine thread. A double nut fastening tool for the structure is also proposed (Patent Document 4). The proposed structure is not practical because adjustment of tightening torque sometime cannot be separately performed for each of the nuts.

DISCLOSURE OF THE INVENTION

In particular, for fastening involved in mass production, there is a demand for accurate torque management in a short time and for each of individual nuts The fastening tool according to a fourth invention is characterized in that, in any one of the first to third inventions, a third urging member (14) for urging the second fastening body (4) toward the opening section (1a, 30a) is arranged between the inner annular body (3) and the flange shaft body (5).

The fastening tool according to a fifth invention is characterized in that, in any one of the first to third inventions, the first fastening body (2) is a coarse thread nut and the second fastening body (4) is a fine thread nut.

The fastening tool according to a sixth invention comprises:

an outer annular body (70) that is driven to rotate and has, in a front thereof, an opening section (70a) for engaging a first fastening body (2);

an inner annular body (71) that is housed to be driven to rotate relatively in the outer annular body (70) and has, in the front thereof, an insertion hole (71a) coaxial with the opening section (70a) for engaging a second fastening body (4);

a flange shaft body (72) having a flange (72a) in the front portion and a shaft section (72c) for rotational driving in the rear portion, in which the front end face of the flange (72a) is provided relatively rotatably in contact with the rear end face (71b) of the inner annular body (71);

a clutch member (76) having, in the front portion, an inner diameter section (76c) that is engaged with the shaft section (72c) of the flange shaft body (72) movably only in an axis direction and an outer diameter section (76a) as the outer circumference of the inner diameter section (76c) and having, in the rear portion, an operation section (76b) for rotational driving at the rear end portion;

a coupling member (77) fixed to the rear portion of the outer annular body (70) and engageably and disengageably meshing with the outer diameter section (76a);

a plurality of through holes (72b) arranged in the flange (72a) and passing therethrough;

engaging sections (71c) arranged on the rear end face of the inner annular body (71) so as to correspond to the through holes (72b);

a plurality of balls (73) capable of fitting in the engaging sections (71c) and inserted into the through holes (72b); and a pressing member (75) provided between the flange shaft body (72) and the coupling member (77) and pressing the flange shaft body (72) and the balls (73) towards the inner annular body (71).

The fastening tool according to a seventh invention is characterized in that, in the sixth invention, the pressing member (75) is a disc spring (75).

The fastening tool according to an eighth invention is characterized in that, in the sixth invention, a pressing force adjusting member (80) is interposed between the pressing member (75) and the coupling member (77).

The fastening tool according to a ninth invention is characterized in that, in the sixth invention, a spring member (78) that urges the clutch member (76) backward is arranged in the front portion of the clutch member (76).

The fastening tool according to the present invention is a fastening tool that can simultaneously fasten two nuts in the same fastening process and can efficiently fasten the nuts in a short time. The fastening tool is simplified and configured to be easily operated. In particular, the fastening tool according to the present invention is a fastening tool having an advantage that tightening torque different for each of the nuts can be optimally set.

BEST MODE FOR CARRYING OUT THE INVENTION

First Embodiment

Figure 1:
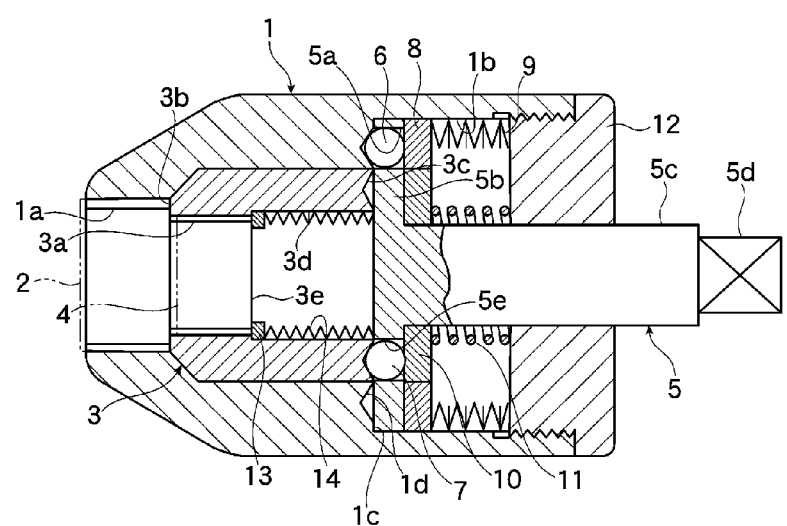
FIG. 1 is a sectional view of a fastening tool showing a first embodiment of the present invention.

A first embodiment of the present invention will be explained below with reference to the drawings. FIG. 1 is a sectional view of a fastening tool according to a first embodiment of the present invention. While the fastening tool can be made to rotate by manual operation, it is a precondition that the fastening tool is made to rotate by a driving body driven by a motor. In the first embodiment, the fastening tool is explained as being operated while being attached to a socket or the like of a rotating body driven to rotate by a motor such as an electric motor or an air motor. An outer annular body 1, which is a main body of the fastening tool, is driven to rotate when a nut is to be tightened. The outer annular body 1 is a member which has a plurality of circular holes in multiple stages on the inside and has an external cylindrical shape. An opening section 1a at the front end of the outer annular body 1 is formed as an insertion hole for inserting a first nut 2 (shown by an imaginary line). The hole in the opening section 1a is of a shape matched to the external shape of the first nut 2 having a hexagonal shape. Accurately, twelve concaves and convexes are formed on the inner circumferential surface of the opening section 1a (in this example, corners having an angle of 120 degrees are formed). Corners of the first nut 2 are gripped by the concaves and convexes.

The external shape of the first nut 2 varies depending on types of nuts. In this example, the first nut 2 is a general hexagonal nut. The inside of the outer annular body 1 is a space for assembling and housing the respective members. An inner hole 1b, which is a cylindrical inner hole, is formed. The inner hole 1b schematically consists of a small diameter section at the front end and a large diameter section at the rear end. A step surface (a bearing surface) 1c as the boundary between the small diameter section and the large diameter section is formed in the center, which corresponds to the difference in diameter between the small diameter section and the large diameter section. The front end portion of the small diameter section of the inner hole 1b is formed to be of a inner conical shape. The front end of the inner annular body 3 is in contact with and incorporated in the hole of the inner conical shape. The inner annular body 3 is tubular. A through-hole is formed in the center of the inner annular body 3. The inner annular body 3 is incorporated in the outer annular body 1 to be relatively rotatable therein. An insertion hole 3*a* for gripping a second nut 4 is formed at the front end of the through-hole of the inner annular body 3.

The insertion hole 3*a* of the inner annular body 3 is coaxial and communicates with the opening section 1*a* of the outer annular body 1. The insertion hole 3*a* is a through hole in which twelve concaves and convexes are formed on the inner circumferential surface (in this example, corners having an angle of 120 degrees are formed) in order to grip the second nut 4. The second nut 4 is used as a lock nut to prevent the first nut 2 from loosening. The insertion hole 3*a* is a through hole having a shape different from the shape of the first nut 2 and having a shape matched to the external shape of the second nut 4. The size of the outer diameter of the second nut 4 in this example is different from and smaller than the outer diameter of the first nut 2. Therefore, when the first nut 2 is inserted into the opening section 1*a*, the front end surface of the inner annular body 3 functions as an abutting surface 3*b* that comes into contact with the rear end face of the first nut 2. On the other hand, a flange shaft body 5 is inserted in the large diameter section of the inner hole 1*b* of the outer annular body 1.

The front end face of the flange shaft body 5 is in contact with the step surface 1*c* of the inner hole 1*b* of the outer annular body 1. A disk-shaped flange 5*b* is formed at the front end portion of the flange shaft body 5. A shaft 5*c* is formed in a rear portion of the flange body 5 integrally therewith. An operation section 5*d* is provided at the rear end of the shaft 5*c*. The front end face of the flange 5*b* in the flange shaft body 5 is in contact with the step surface 1*c* of the outer annular body 1 and the rear end face of the inner annular body 3. The flange shaft body 5 and the inner annular body 3 are arranged coaxially with each other. In the flange 5*b*, a plurality of through holes 5*a* and a plurality of through holes 5*e* are arranged at an equal angle interval from one another and arranged coaxially with one another respectively. In this example, there are six through holes 5*a* and three through holes 5*e*. The center axial line of each of the six through holes 5*a* is disposed further in an outer position than the center axial line position of each of the three through holes 5*e*. In other words, the center axial line positions of the through holes 5*a* and the through holes 5*e* are different in the radial direction from the center axial line of the flange shaft body 5.

In short, the through holes 5*a* and the through holes 5*e* of the flange 5*b* are respectively arranged as a plurality of holes so that the through holes 5*a* are arranged in positions opposed to the step surface 1*c* of the outer annular body 1 and the through holes 5*e* are arranged in positions opposed to the end face of the inner annular body 3. First balls 6 are inserted in the through holes 5*a*. Similarly, second balls 7 are inserted in the through holes 5*e*. On the other hand, outer annular body notches 1*d* are formed on the step surface 1*c* of the outer annular body 1 to correspond to the first balls 6. The outer annular body notches 1*d* are conical recesses. The first balls 6 can fit in the recesses.

Inner annular body notches 3*c* are formed at three points on the rear end face of the inner annular body 3 at an equal angle interval to correspond to the second balls 7. The inner annular body notches 3*c* are conical recesses. The second balls 7 can fit in the recesses. A disk-shaped first collar 8 is held in contact with the outer circumferential side of the flange 5*b* and a disk-shaped second collar 10 is held in contact with the inner circumferential side of the flange 5*b* in a state in which the first and second collars 8 and 10 are coaxially pressed towards the flange 5*b*. The first collar 8 is a holding member for preventing the first balls 6 from dropping out of the through holes 5*a*. The first collar 8 is always movably pressed from the rear towards the step surface 1*c* side of the outer annular body 1 by a first urging member 9 for urging the first collar 8 to the flange 5*b* side. In other words, the first collar 8 is held in contact with the first balls 6 and the back of the flange 5*b* to prevent the first balls 6 from dropping out of the through holes 5*a*.

Similarly, the second collar 10, as a holding member, holds the second balls 7 in contact with the back of the flange 5*b* to prevent the second balls 7 from dropping out of the through holes 5*e*. The second collar 10 is always movably pressed towards the inner annular body 3 side in contact with the flange 5*b* side by a second urging member 11. The first urging member 9 and the second urging member 11 are held by a lid member 12 screwed into an end portion of the inner hole 1*b* of the outer annular body 1. Eventually, the first urging member 9 is held to be compressed between the first collar 8 and the lid member 12. The second urging member 11 is held to be compressed between the second collar 10 and the lid member 12.

In this example, the first urging member 9 is a disc-shaped spring and is a so-called disc spring swelled like a dish in shape. A coil spring may be used instead of such a disc spring. The second urging member 11 is a coil spring in this example. A disc spring may be used instead of such a coil spring. The shaft 5*c* of the flange shaft body 5 is structured to protrude backward from the outer annular body 1. The front end portion of the shaft 5*c* forms the operation section 5*d*. In other words, the operation section 5*d* is a joint of a socket type for connecting the flange shaft body 5 to a motor (not shown in the figure) for driving the flange shaft body 5 to rotate.

The flange 5*b* side (the rear) of the inner annular body 3 is formed as a through hole 3*d* having a step. A washer 13 is in contact with a step section 3*e* and provided movably in a center axis direction. Further, a third urging member 14 that urges the washer 13 towards the step section 3*e* is arranged between the rear end face of the washer 13 and the front end face of the flange 5*b*. The third urging member 14 is a coil spring in this example. However, the third urging member 14 may be a disc spring instead of such a coil spring.

Action

Figure 2:
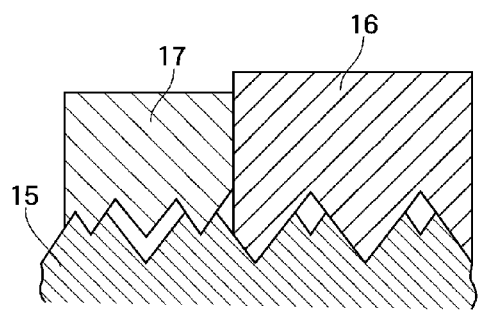
FIG. 2 is a partially cutaway explanatory diagram of a screw body provided with a coarse thread and a fine thread.

The fastening tool according to the first embodiment has the structure explained above. The operation and the functions of the fastening tool will be explained below. A screw body, to which the first embodiment is applied, is a bolt 15 in which different pitches for a coarse thread and a fine thread are formed as shown in FIG. 2. A fine thread nut 17 as a lock nut having a small pitch compared with a coarse thread nut 16 is screwed onto the bolt 15 having this screw configuration together with the coarse thread nut 16. Consequently, the two nuts having the different pitches are mounted in a locked state in which the nuts thrust each other so that a fastening structure is formed in a fastening configuration having a locking function.

In the bolt 15, as shown in the figure, a fine thread is formed on a coarse thread. Therefore, the coarse thread nut 16 and the fine thread nut 17 can be coaxially screwed onto the bolt 15 having this thread configuration. This screw fastening system utilizes an advantage such that, when the coarse thread nut 16 and the fine thread nut 17 come into contact with and to be united each other during fastening, the nuts less easily loosen because the nuts respectively have the different pitches. The fastening tool according to the first embodiment is configured to simultaneously fasten the coarse thread nut 16 and the fine thread nut 17 onto the bolt 15 having the form of the two screws and tighten the nuts. FIG. 1 shows a state immediately before the first nut 2, which is the coarse thread nut 16, and the second nut 4, which is the fine thread nut 17, are inserted into the fastening tool and fastened to the bolt 15.

Figure 3:
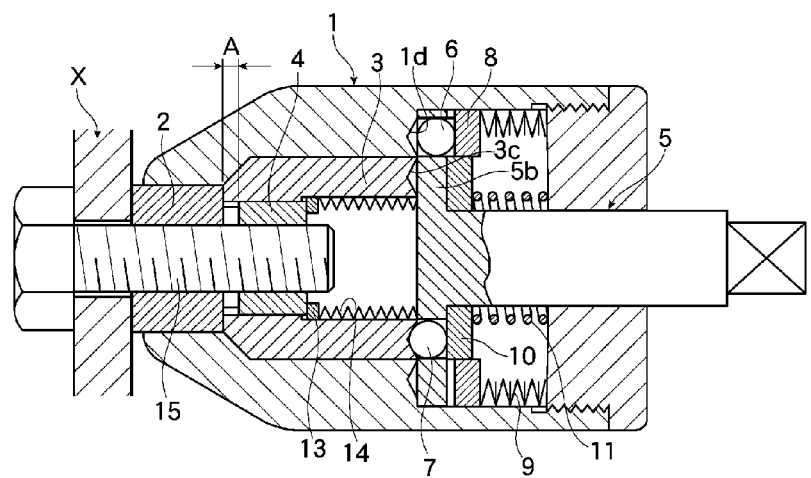
FIG. 3 is a sectional view showing the fastening tool configuration in a state in which a first nut is fastened.

In other words, this is a state in which the first nut 2 and the second nut 4 are inserted into the opening section 1a and the insertion hole 3a respectively in advance. In this state, the operation section 5d is driven to rotate, whereby the flange shaft body 5 is caused to rotate to drive the first nut 2 and the second nut 4 to rotate. Since the first balls 6 are pressed towards the outer annular body notches 1d by an urging force of the first urging member 9, the outer annular body 1 rotates integrally with the flange shaft body 5 due to frictional force. Similarly, since the second balls 7 are pressed towards the inner annular body notches 3c by an urging force of the second urging member 11, the inner annular body 3 rotates, due to frictional force, together with the outer annular body 1 and integrally with the flange shaft body 5. FIG. 3 shows a state in which only the first nut 2 is fastened to the bolt 15 in order to fix a structure X.

The first nut 2 and the second nut 4 are fastened to the bolt 15 by the same rotation in the beginning of the fastening. However, since the pitches are different, the second nut 4 of the fine screw thread having a smaller pitch compared with the coarse thread screw moves (is fastened) later than the first nut in the process of the fastening. Therefore, a shift by a space A occurs for the second nut 4 when the fastening of the first nut 2 is completed (see FIG. 3). The second nut 4 is movable in the axial direction in the inner annular body 3. Therefore, as shown in FIG. 3, the second nut 4 presses the washer 13 in the rearward direction and moves to the inside, that is, in the rearward direction against an urging force of the third urging member 14.

When the first nut 2 has been fastened, the outer annular body 1 stops the rotation because torque exceeds a predetermined value. However, the flange shaft body 5 still continues the rotation. Therefore, at this time, the first balls 6 move against the urging force of the first urging member 9, come into contact the first collar 8 and come off and rise from the outer annular body notches 1d. The first balls 6 idly rotate along with the rotation of the flange shaft body 5 while coming into contact with the step surface 1c of the outer annular body 1. Consequently, the flange shaft body 5 can rotate relatively to the outer annular body 1.

Figure 4:
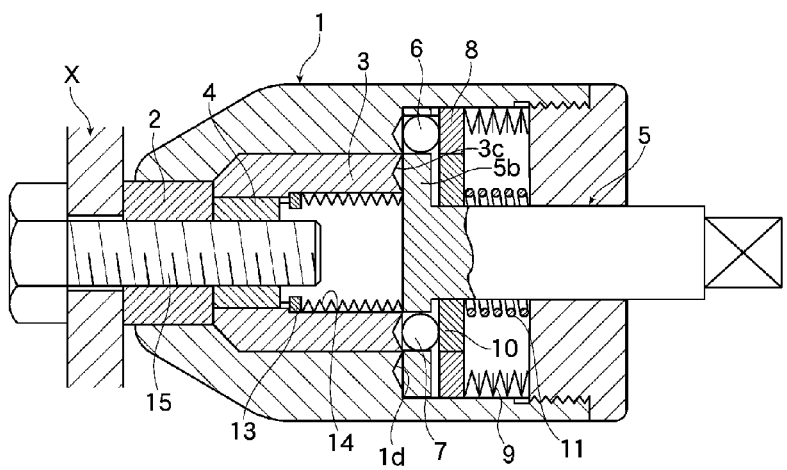
FIG. 4 is a sectional view showing the fastening tool configuration in a state in which a second nut is fastened.

On the other hand, the inner annular body 3 maintains the state in which the inner annular body 3 is integrated with the flange shaft body 5 via the second balls 7. The inner annular body 3 rotates together with the flange shaft body 5. Consequently, the second nut 4 continues to be tightened onto the bolt 15 and moves towards the first nut 2. FIG. 4 shows a locked state in which the second nut 4 comes into contact with the first nut 2 and the fastening is completed. At this time, the rotation of the inner annular body 3 stops. In this case, similarly as when the outer annular body 1 has stopped, the flange shaft body 5 still continues to rotate. At this time, the second balls 7 move against the urging force of the second urging member 11, come into contact with the second collar 10 and come off and rise from the inner annular body notches 3c. The second balls 7 idly rotate together with the rotation of the flange shaft body 5 while coming into contact with the end face of the inner annular body 3.

The flange shaft body 5 rotates in an idle rotation state relatively to the outer annular body 1 and the inner annular body 3 in this way. However, an operator can grasp the idle rotation state at this time from idle rotation sound of the first balls 6 and the second balls 7 and learn the completion of fastening by the two nuts. Therefore, the operator immediately stops the rotation of the flange shaft body 5. As explained above, according to the first embodiment, it is possible to fasten the two nuts in one fastening operation in a state in which the fine thread nut is inserted in the insertion hole 3a of the inner annular body 3 and the coarse thread nut 2 is inserted in the insertion hole 1a of the outer annular body 1 of the fastening tool. This means that it is possible to automatically fasten the two nuts 2 and 4 with predetermined tightening torques only by rotating the operation section 5d of the flange shaft body 5 toward the bolt 15 with a motor such as an electric motor or an air motor.

When the coarse thread nut 2 and the fine thread nut 4 are fastened, the magnitude of the tightening torque of the coarse thread nut 2 depends on the elasticity (spring constant) of the first urging member 9, an angle (angle of inclination) of the conical recesses of the outer annular body notches 1d and a coefficient of friction. Similarly, the magnitude of the tightening torque of the fine thread nut 4 depends on the elasticity (spring constant) of the second urging member 11, an angle (angle of inclination) of the conical recesses of the inner annular body notches 3c and a coefficient of friction. In this embodiment (see FIG. 1), the coil spring or the disc spring is used as the first urging member 9 or the second urging member 11. However, the first urging member 9 or the second urging member 11 is not limited to the coil spring or the disc spring and may be, for example, elastic rubber or the like. To change the tightening torques of the first nut (coarse thread) 2 and the second nut (fine thread) 4, it is preferable to adjust the levels of the elasticity of the first and second urging members or prepare a plurality of urging members having different levels of elasticity and change the urging members according to necessity.

Modification of the First Embodiment

Figure 5:
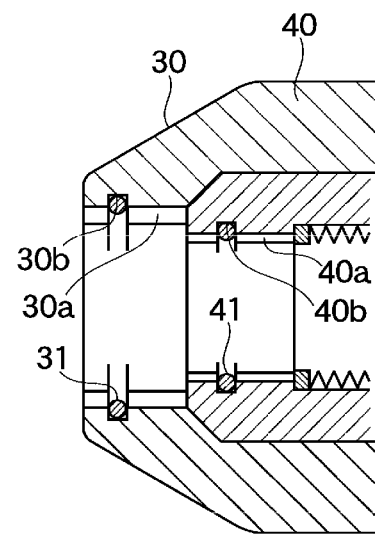
FIG. 5 is a partial sectional view showing another embodiment and a configuration in which holding members for drop prevention for a first nut and a second nut are provided in an outer annular body and an inner annular body.

FIG. 5 is a partial sectional view showing a modification obtained by modifying a part of the first embodiment taking prevention of nuts from coming off into account. In structure of the modification, grooves are provided in insertion holes for the nuts and ring-shaped elastic bodies are made to fit in the grooves. A drop prevention groove 30b for the first nut 2 is cut in the inner circumferential surface of the opening section 30a of an outer annular body 30 and a ring-shaped elastic body 31 is attached into the drop prevention groove 30b. Similarly, a drop prevention groove 40b for the second nut 4 is cut in the inner circumferential surface of an insertion hole 40a of an inner annular body 40 and a ring-shaped elastic body 41 is attached into the drop prevention groove 40b. The first nut 2 and the second nut 4 are pushed in against the elastic bodies 31 and 41 and held.

Figure 6:
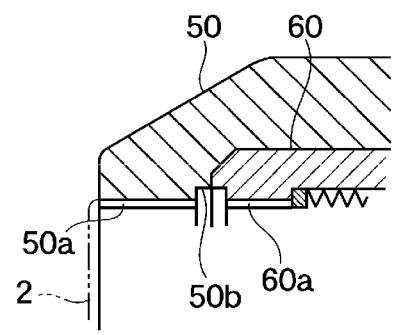
FIG. 6 is a sectional view showing a modification of the first embodiment and a fastening tool configuration in which external shapes of the first nut and the second nut are the same.

By adopting this configuration, the first nut 2 and the second nut 4 never drop in attaching operation of the first nut 2 and the second nut 4, even if the fastening tool tilts. If the first nut 2 is to be inserted immediately after the second nut 4 has been inserted, the first nut 2 and the second nut 4 may be held by the elastic body 31 alone. FIG. 6 shows a structure of a modification obtained by further modifying a part of the first embodiment as an example applied to a case, in which the external shapes of a coarse thread nut and a fine thread nut have the same outer diameter. In this case, since the hole shape of an outer annular body 50 and the hole shape of an inner annular body 60 are the same, the fine thread nut is inserted from the opening section 50a of the outer annular body 50 in the same manner as the coarse thread nut. However, there is no step between the outer annular body 50 and the inner annular body 60. Therefore, the nuts have the same external shape and are inserted while overlapping.

In particular, when thickness values of the first nut 2 are dispersed and the width of the first nut 2 is too large or too small exceeding an allowable dimension for attachment, a situation may occur in which the first nut 2 comes close to the outer annular body 50 side or the inner annular body 60 side and the first nut 2 interferes with the inner annular body 60, when being fastened, to prevent the inner annular body 60 from rotating. In other words, when the outer annular body 50 stops, the inner annular body 60 also stops because of the interference. To avoid this problem, a part of a boundary portion between the outer annular body 50 and the inner annular body 60, i.e., a part of an engaging portion 50b of the outer annular body 50 and a part of an engaging portion 60a of the inner annular body 60 in an allowable width range of the first nut 2 are cut out in a groove shape.

Figure 7:
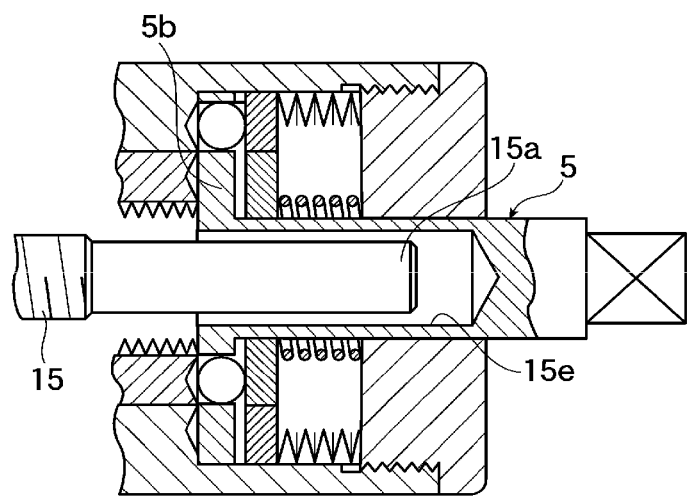
FIG. 7 is a sectional view showing, as another modification of the first embodiment, a fastening tool configuration corresponding to a long bolt.

Consequently, even if the thickness of the first nut 2 exceeds the width of the opening section, the first nut 2 is prevented from interfering with the inner annular body 60. Even if the second nut 4 comes close to the outer annular body 50 side, the second nut 4 is prevented from interfering with the outer annular body 50. Therefore, the inner annular body 60 can continue to rotate even if the outer annular body 50 stops because of the fastening of the first nut 2. In an example shown in FIG. 7, a long extended portion 15a continuous to the thread section of the bolt 15 is taken into account. A hole 15e for preventing interference of the extended portion 15a of the bolt is formed from an end face side on the flange 5b side of the flange shaft body 5. Consequently, even if a screw section end is a long extended portion without thread, the bolt 15 can be fastened without interfering with the flange shaft body 5.

Second Embodiment

Figure 8:
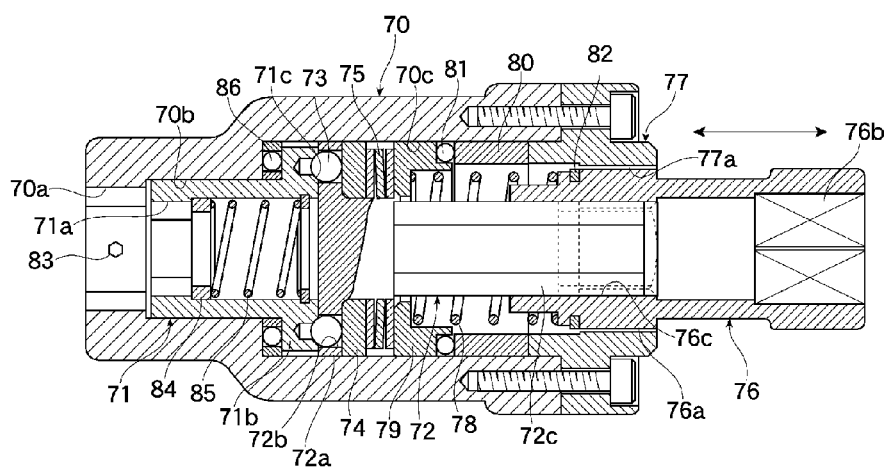
FIG. 8 is a sectional view showing, as a second embodiment of the present invention, a fastening tool having a configuration in which an operation section is engaged in a clutch form.

FIG. 8 is a sectional view showing, as a second embodiment of the present invention, a fastening tool having a structure in which an operation section is engaged in a clutch form. The second embodiment will be explained below with reference to FIG. 8. An outer annular body 70, which is a main body of the fastening tool, is a cylindrical member having an inner hole like the outer annular body 1 explained above. An insertion hole for inserting the first nut 2 is formed in an opening section 70a at the front end. In the inner hole of the outer annular body 70, a small diameter section 70b and a large diameter section 70c larger than the inner diameter of the small diameter section 70b are formed. A front portion of an inner annular body 71 is inserted into the small diameter section 70b. A flange 71b in a rear portion integral with the front portion of the inner annular body 71 is inserted to be housed in the large diameter section 70c. Thrust balls 86 are arranged in a step section in a boundary between the small diameter section 70b and the large diameter section 70c.

Since the thrust balls 86 are arranged in the inner annular body 71, the inner annular body 71 and the outer annular body 70 are relatively rotatably supported. An inner hole, which is a cylindrical through hole, is formed in the center of the inner annular body 71. An insertion hole 71a, which is an inner hole for gripping the second nut 4, is formed at the front end portion of the inner annular body 71. The insertion hole 71a is coaxial with the opening section 70a of the outer annular body 70 and communicates with the opening section 70a. Notches 71c are formed in the rear end face of the flange 71b at the rear end portion of the inner annular body 71. The notches 71c are recesses for positioning and housing balls 73. A flange shaft body 72 is coaxially arranged opposing the rear end face of the flange 71b. A flange section 72a is formed on the front end face of the flange shaft body 72.

In the flange section 72a, a plurality of through holes 72b passing through the flange section 72a is arranged in angularly spaced positions corresponding to the notches 71c of the inner annular body 71. The balls 73 are respectively inserted in the through holes 72b. A collar 74, which is an annular plate material, is arranged on the opposite side opposing the notches 71c across the flange section 72a. The collar 74 is in contact with the rear end face of the flange section 72a and the balls 73 and prevents the balls 73 in the through holes 72b from dropping out with urging force of a spring body 75, which is a disc spring. In other words, the spring body 75 presses the balls 73 forward via the collar 74 and always pushes the balls 73 into the notches 71c. A portion of a shaft section 72c, which is a rear portion of the flange shaft body 72, forms a driving shaft having a hexagonal sectional shape.

An inner diameter section 76c of a clutch member 76, the inner surface of which is hexagonal in sectional shape, is outserted and engaged with the shaft section 72c. For this sake, the clutch member 76 is capable of advancing and retracting in a direction indicated by an arrow, i.e., a center axis direction of the shaft section 72c. The rear portion of the clutch member 76 protrudes to rearward of the outer annular body 70. An outer diameter section 76a, which is the front end portion of the clutch member 76, is formed in a hexagonal sectional shape. A cover member 77 is fixed to the rear end of the outer annular body 70 by bolts. An inner diameter section 77a as a through hole, which has an inner surface of hexagonal shape in section, is formed in the center of the cover member 77. The outer diameter section 76a at the front end portion of the clutch member 76 engages with the inner diameter portion 77a and relatively slides in an axis direction of the inner diameter section 77a forward and rearward. Eventually, the outer diameter section 76a is interposed between the cover member 77 and the shaft section 72c.

A coil spring 78 for pressing the clutch member 76 outward (to the right side in the figure) is arranged between a holding member 79 explained below and the outer diameter section 76a. The holding member 79 is rotatably supported by balls 81 in the large diameter section 70c, which is the inner hole of the outer annular body 70. The front end face of the holding member 79, which is a cylindrical member, is arranged in contact with the rear end face of the spring body 75. A through hole for passing through the flange shaft body 72 is formed in the center of the holding member 79. A housing hole for housing the coil spring 78 is formed in the holding member 79. The front end face of the coil spring 78 is in contact with the bottom surface (the front end face) of the housing hole. The rear end face (the right end in the figure) of the coil spring 78 is pressed against the clutch member 76.

The rear end portion of the coil spring 78 is inserted and arranged to be wound around a front portion of the clutch member 76. To prevent the clutch member 76 from disengaging outward, an annular stop member 82 provided in the clutch member 76 is, at the end of its movement, in contact with the step section in the cover member 77, i.e., a step section at the boundary between the portion having a hexagonal sectional shape and the circular inner hole in the inner diameter section 77a. With this, the clutch member 76 is stopped in a predetermined position (a rear position). An adjustment collar 80, which is a cylindrical member, is arranged between the holding member 79 and the cover member 77. The urging force of the spring body 75 can be adjusted according to the extent of the width of the adjustment collar 80. It is possible to adjust a pressing force applied to the inner annular body 71 via the balls 73 by changing the urging force (spring constant) of the spring body 75.

As a result, the rotation torque of the flange shaft body 72 for fastening the fine thread can be adjusted. The rear end section 76b of the clutch member 76 is an engaging section with a driving body. The fastening tool having such a configuration performs fastening of a bolt and a nut according to operation explained below. FIG. 8 shows a configuration for fastening a coarse thread nut. The rear end section 76b of the clutch member 76 is formed as a structure in which, although not shown in the figure, a driving body such as a driver can engage. In a state shown in FIG. 8, the driving member is engaged with the inner diameter section 77a of the cover member 77 via the outer diameter section 76a of the clutch member 76. Therefore, when the clutch member 76 is driven to rotate, the outer annular body 70 is driven to rotate via the outer diameter section 76a. As in the fastening tool according to the first embodiment explained above, the first nut 2 is driven to rotate and fastened to a bolt with the rotation of the outer annular body 70.

At this time, the inner annular body 71 rotates together with the outer annular body 70 because the shaft section 72c of the flange shaft body 72 is engaged with the inner diameter section 76c of the clutch member 76. When the fastening of the first nut 2 is completed, the torque of the outer annular body 70 exceeds a determined torque. Therefore, a safety device of the driver functions to stop the rotation of the outer annular body 70. Subsequently, when the clutch member 76 is further pushed in against the urging force of the coil spring 78, engaging sections of the clutch member 76 and the outer annular body 70 is disengaged. Then, the outer annular body 70 is set free and the clutch member 76 can rotate again.

At this time, the inner diameter section 76c of the clutch member 76 is engaged with the shaft section 72c of the flange shaft body 72. Therefore, the flange shaft body 72 is forcibly driven to rotate. With the rotation of the flange shaft body 72, frictional force is generated by pressing against the balls 73 involved in pressing of the spring body 75 and the collar 74. The inner annular body 71 rotates with the frictional force and causes the second nut 4 to rotate and be fastened. When the fastening of the second nut 4 is completed, the rotation of the inner annular body 71 stops. However, the balls 73 rise up from the flange surface 71b of the inner annular body 71. Then, the flange shaft body 72 idly rotates above the rear end face of the flange 71b. Since sound is generated at this time, the operator stops driving of the driver and stops the fastening operation of the fastening tool.

Consequently, as in the fastening tool according to the first embodiment, it is possible to simultaneously fasten a coarse thread nut and a fine thread nut having different pitches to a same bolt in a simultaneous operation. While the adjustment collar 80 is caused to abut against the holding member 79 in a state in which the balls 81 are held in the holding member 79, it is possible to adjust the fastening torque of the fine thread nut, because the urging force of the spring body 75 can be changed by changing the width of the adjustment collar 80. When the fine thread nut is to be firmly tightened, the width of the adjustment collar 80 is set rather large. When the fine thread nut is lightly tightened, the length of the adjustment collar 80 is set rather small. Since the balls 81 are interposed, the adjustment collar 80 does not rotate when the fine thread nut is to be tightened.

With such a structure, the entire fastening tool rotates, when the first nut 2 is to be tightened. However, when the second nut 4 is to be fastened, the rotation of the outer annular body 70, the cover member 77 and the adjustment collar 80 is stopped by pushing the clutch member 76 in. As a result, by adopting this structure, when the second nut 4 is to be fastened, it is possible to adjust fastening torque and fasten the second nut 4 in a state in which no load is generated in the outer annular body 70. Further, a driving body such as an impact driver can be directly attached to the clutch member 76.

Therefore, the operator can easily perform fastening operation of the two nuts simultaneously while supporting only the driver. The structure and the operation of the second embodiment are as explained above. A holding structure for the first nut 2 and the second nut 4 is the same as that according to the first embodiment. In the beginning of fastening, the first nut is held by a spring plunger 83 provided in the outer annular body 70 and the second nut is held by a washer 84 and a coil spring 85 provided in the inner annular body 71.

The second embodiment explained above is not limited to carrying out independently. It goes without saying that the second embodiment may be used in combination with other embodiments or modifications. For example, in the modification of the first embodiment shown in FIG. 6, it is conceivable to provide holding members (31, 41) for fastening bodies as in the modification of the first embodiment shown in FIG. 5. In this case, where double nut fastening is performed in the same pitch screw, fastening of the first fastening body is completed at first by setting a first fastening body and a second fastening body spaced apart from each other in a fastening tool and actuating the fastening tool. After this, fastening of the second fastening body on the first fastening body can be completed by further actuating the fastening tool continuously, since only the second fastening body is actuated.

What is claimed is:

1. A fastening tool comprising:
an outer annular body (1) that is driven to rotate and has, in the front thereof, an opening section (1a) for engaging a first fastening body (2);
an inner annular body (3) that is housed relatively rotatably in the outer annular body (1) to be driven to rotate and has, in the front thereof, an insertion hole (3a) coaxial with the opening section (1a) for engaging a second fastening body (4);
a flange shaft body (5) having a flange (5b) in the front portion and an operation section (5d) for rotational driving in the rear portion, in which the front end face of the flange (5b) is provided relatively rotatably in contact with a step surface (1c) formed in an inner hole (1b) as a space inside the outer annular body (1) and the rear end face of the inner annular body (3);
a plurality of first and second through holes (5a) and (5e) formed in the flange (5b), the center axial lines of the first through holes being disposed further in an outer position than the center axial line of the second through holes;
outer annular body engaging sections (1d) as recessed portions arranged and formed on the step surface (1c) so as to correspond to the first through holes (5a);
inner annular body engaging sections (3c) as recessed portions arranged and formed on the rear end face of the inner annular body (3) so as to correspond to the second through holes (5e);
a plurality of first balls (6) capable of fitting in the outer annular body engaging sections (1d) and inserted into the first through holes (5a);
a plurality of second balls (7) capable of fitting in the inner annular body engaging sections (3c) and inserted into the second through holes (5e);
a first holding member (8) in contact with the rear end face of the flange (5b) and holding the first balls (6);
a second holding member (10) in contact with the rear end face of the flange (5b) and holding the second balls (7);

a first urging member (9) arranged between the first holding member (8) and the outer annular body (1) for pressing the first holding member (8) toward the flange shaft body (5); and a second urging member (11) arranged between the second holding member (10) and the outer annular body (1) and pressing the second holding member (10) toward the flange shaft body (5).

2. The fastening tool according to claim 1, characterized in that a holding member (31) for holding the first fastening body (2) in the opening section (1a, 30a) is arranged in the opening section (1a, 30a).

3. The fastening tool according to claim 1, characterized in that a holding member (41) for holding the second fastening body (4) in an insertion hole (40a) is arranged in the insertion hole (3a, 40a).

4. The fastening tool according to claim 1, characterized in that a third urging member (14) for urging the second fastening body (4) toward the opening section (1a, 30a) is arranged between the inner annular body (3) and the flange shaft body (5).

5. The fastening tool according to claim 1, characterized in that the first fastening body (2) is a coarse thread nut and the second fastening body (4) is a fine thread nut.

6. A fastening tool comprising:
an outer annular body (70) that is driven to rotate and has, in a front thereof, an opening section (70a) for engaging a first fastening body (2);
an inner annular body (71) that is housed to be driven to rotate relatively in the outer annular body (70) and has, in the front thereof, an insertion hole (71a) coaxial with the opening section (70a) for engaging a second fastening body (4);
a flange shaft body (72) having a flange (72a) in the front portion and a shaft section (72c) for rotational driving in the rear portion, in which the front end face of the flange (72a) is provided relatively rotatably in contact with the rear end face (71b) of the inner annular body (71);
a clutch member (76) having, in the front portion, an inner diameter section (76c) that is engaged with the shaft section (72c) of the flange shaft body (72) movably only in an axis direction and an outer diameter section (76a) as the outer circumference of the inner diameter section (76c) and having, in the rear portion, an operation section (76b) for rotational driving at the rear end portion;
a coupling member (77) fixed to the rear portion of the outer annular body (70) and engageably and disengageably meshing with the outer diameter section (76a);
a plurality of through holes (72b) arranged in the flange (72a) and passing therethrough;
engaging sections (71c) arranged on the rear end face of the inner annular body (71) so as to correspond to the through holes (72b);
a plurality of balls (73) capable of fitting in the engaging sections (71c) and inserted into the through holes (72b); and
a pressing member (75) provided between the flange shaft body (72) and the coupling member (77) and pressing the flange shaft body (72) and the balls (73) towards the inner annular body (71).

7. The fastening tool according to claim 6, characterized in that the pressing member (75) is a disc spring (75).

8. The fastening tool according to claim 6, characterized in that a pressing force adjusting member (80) is interposed between the pressing member (75) and the coupling member (77).

9. The fastening tool according to claim 6, characterized in that a spring member (78) that urges the clutch member (76) backward is arranged in the front portion of the clutch member (76).

10. The fastening tool according to claim 2, characterized in that a third urging member (14) for urging the second fastening body (4) toward the opening section (1a, 30a) is arranged between the inner annular body (3) and the flange shaft body (5).

11. The fastening tool according to claim 3, characterized in that a third urging member (14) for urging the second fastening body (4) toward the opening section (1a, 30a) is arranged between the inner annular body (3) and the flange shaft body (5).

12. The fastening tool according to claim 2, characterized in that the first fastening body (2) is a coarse thread nut and the second fastening body (4) is a fine thread nut.

13. The fastening tool according to claim 3, characterized in that the first fastening body (2) is a coarse thread nut and the second fastening body (4) is a fine thread nut.

* * * * *